United States Patent
Jiang et al.

(10) Patent No.: US 10,257,202 B1
(45) Date of Patent: Apr. 9, 2019

(54) SYSTEMS AND METHODS FOR LOGGING USERS OUT OF ONLINE ACCOUNTS

(71) Applicant: Symantec Corporation, Mountain View, CA (US)

(72) Inventors: Kevin Jiang, San Mateo, CA (US); Ilya Sokolov, Boston, MA (US); Rickey Ray, Goleta, CA (US)

(73) Assignee: Symantec Corporation, Mountain View, CA (US)

( * ) Notice: Subject to any disclaimer, the term of this patent is extended or adjusted under 35 U.S.C. 154(b) by 271 days.

(21) Appl. No.: 15/236,071

(22) Filed: Aug. 12, 2016

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 21/31 | (2013.01) |
| G06F 21/62 | (2013.01) |

(52) U.S. Cl.
CPC .......... *H04L 63/102* (2013.01); *G06F 21/313* (2013.01); *G06F 21/6263* (2013.01); *H04L 63/0838* (2013.01); *H04L 63/0853* (2013.01); *H04L 63/18* (2013.01)

(58) Field of Classification Search
None
See application file for complete search history.

(56) References Cited

U.S. PATENT DOCUMENTS

| | | | |
|---|---|---|---|
| 8,396,452 B1 | 3/2013 | Matsuoka | |
| 2014/0258970 A1* | 9/2014 | Brown | G06F 8/47 717/103 |
| 2015/0089607 A1* | 3/2015 | Hubner | H04L 63/0838 726/6 |
| 2016/0380931 A1* | 12/2016 | Sircar | H04L 51/043 709/206 |

OTHER PUBLICATIONS

One Time Password; https://en.wikipedia.org/wiki/One-time_password; as accessed on Jul. 31, 2016.
Software Token; https://en.wikipedia.org/wiki/Software_token; as accessed on Jul. 10, 2016.

* cited by examiner

*Primary Examiner* — Kambiz Zand
*Assistant Examiner* — Arezoo Sherkat
(74) *Attorney, Agent, or Firm* — FisherBroyles, LLP

(57) ABSTRACT

The disclosed computer-implemented method for logging users out of online accounts may include (i) receiving, from a first computing device of a user, a request from the user to log into an online account hosted by an online platform, (ii) establishing, between the online platform and a second computing device of the user, a network session that both (a) verifies the identity of the user to the online platform and (b) at least partially disrupts the functionality of the second computing device, (iii) logging the user into the online account via the first computing device, (iv) detecting a request from the user to log out of the online account, and then (v) in response to the request to log out of the online account, (a) restoring full functionality of the second computing device by terminating the network session and (b) logging the user out of the online account.

20 Claims, 7 Drawing Sheets

SYSTEMS AND METHODS FOR LOGGING USERS OUT OF ONLINE ACCOUNTS

BACKGROUND

Online services may allow users to store and manage private data and/or content via online accounts. For example, an online banking service may enable a user to perform various financial transactions after logging into an account (e.g., by providing an authenticated username and password). Unfortunately, confidential and/or sensitive information stored within an online account may be vulnerable to theft or manipulation by attackers while the user is logged into the account. For example, an attacker may remotely gain access to and/or control of an online account (via, e.g., a cross-site request forgery attack) and then perform malicious actions within the account such as changing the account's password or stealing stored credit card information. In addition, an unauthorized user may access a user's online account if the user remains logged into the account on an unattended device.

Many users may inadequately protect their online accounts from such risks. For example, users may choose to remain logged into their accounts to avoid the inconvenience of re-entering authentication credentials when later accessing the accounts. In addition, some users may inadvertently remain logged into online accounts on computing devices accessible to the public, therefore exposing the accounts to potential attackers. As such, the instant disclosure identifies and addresses improved systems and methods for logging users out of online accounts.

SUMMARY

As will be described in greater detail below, the instant disclosure describes various systems and methods for logging users out of online accounts. In one example, a computer-implemented method for logging users out of online accounts may include (i) receiving, from a first computing device of a user, a request from the user to log into an online account hosted by an online platform, (ii) establishing, between the online platform and a second computing device of the user, a network session that both (a) verifies the identity of the user to the online platform and (b) at least partially disrupts the functionality of the second computing device, (iii) in response to establishing the network session between the online platform and the second computing device, logging the user into the online account via the first computing device, (iv) detecting a request from the user to log out of the online account, and then (v) in response to detecting the request to log out of the online account, (a) restoring full functionality of the second computing device by terminating the network session between the online platform and the second computing device and (b) logging the user out of the online account.

In some examples, establishing the network session between the online platform and the second computing device may include establishing a phone call between the online platform and the second computing device. Additionally or alternatively, establishing the network session may include providing, via a network connection between the online platform and the second computing device, a software token that runs on the second computing device.

In some embodiments, the network session may verify the identity of the user to the online platform by providing the user with a one-time password that the user enters to the online platform via the first computing device. In addition, in some examples, the network session may disrupt the functionality of the second computing device by preventing, while the network session is established via an application running in a foreground of the second computing device, the user from accessing at least one additional application installed on the second computing device.

In some embodiments, detecting the request from the user to log out of the online account may include determining that the user has initiated a logout process on the first computing device. In such embodiments, terminating the network session between the online platform and the second computing device may include automatically terminating the network session without input from the user on the second computing device. In other embodiments, detecting the request from the user to log out of the online account may include determining that the user has initiated terminating the network session on the second computing device. In such embodiments, logging the user out of the online account may include automatically logging the user out of the online account without input from the user on the first computing device.

In some examples, the method may further include determining that the user has entered authenticated login credentials into the online platform via the first computing device prior to logging the user into the online account. In addition, in some embodiments, logging the user out of the online account may prevent an unauthorized entity from accessing sensitive data stored within the online account.

In some examples, the method may further include logging the user into the online account via a third computing device of the user while the network session is established between the online platform and the second computing device of the user. In these examples, the method may include logging the user out of the online account on both the first computing device and the third computing device in response to detecting the request to log the user out of the online account.

In one embodiment, a system for implementing the above-described method may include (i) a request module that (a) receives, from a first computing device of a user, a request from the user to log into an online account hosted by an online platform and (b) detects a request from the user to log out of the online account, (ii) an establishing module that establishes, between the online platform and a second computing device of the user, a network session that both (a) verifies the identity of the user to the online platform and (b) at least partially disrupts the functionality of the second computing device, (iii) an authentication module that logs the user into the online account via the first computing device in response to the network session being established between the online platform and the second computing device, and (iv) a termination module that, in response to the request to log out of the online account, (a) restores full functionality of the second computing device by terminating the network session between the online platform and the second computing device and (b) logs the user out of the online account. In addition, the system may include at least one hardware processor that executes the request module, the establishing module, the authentication module, and the termination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, from a first computing device of a user, a request from the user to log into an online account hosted by an online platform, (ii) establish, between the online platform and a second computing device of the user, a network session that both (a) verifies the identity of the user to the online platform and (b) at least partially disrupts the functionality of the second computing device, (iii) in response to establishing the network session between the online platform and the second computing device, log the user into the online account via the first computing device, (iv) detect a request from the user to log out of the online account, and (v) in response to detecting the request to log out of the online account, (a) restore full functionality of the second computing device by terminating the network session between the online platform and the second computing device and (b) log the user out of the online account.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
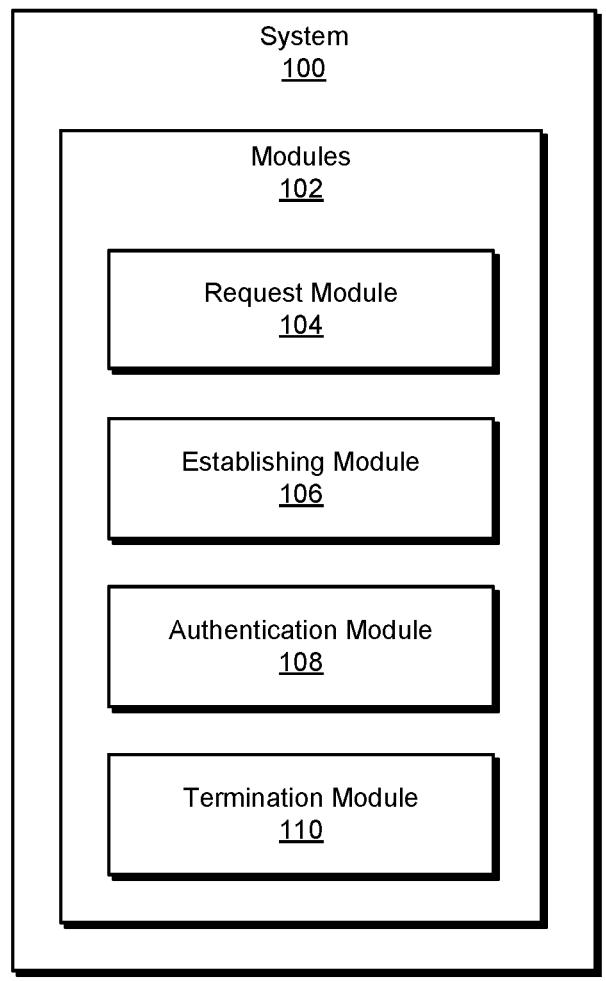
FIG. 1 is a block diagram of an exemplary system for logging users out of online accounts.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for logging users out of online accounts. As will be explained in greater detail below, the systems and methods described herein may improve traditional authentication schemes used to verify owners of online accounts by extending the duration of a network session involved in an authentication scheme to last for the duration of a user's session with their account. For example, the disclosed systems and methods may permit a user to access an online account only while a user's mobile phone remains connected to a phone call or runs a software token used to provide the user with a one-time password verifying the identity of the user. Because the functionality of the user's mobile phone may be limited or impaired while performing such authentication tasks, the systems described herein may motivate the user to log out of the online account when the user completes their session with the online account (so that the user may regain full use of their mobile phone). As such, the disclosed systems and methods may prevent users from inadvertently or intentionally remaining logged into online accounts, thereby reducing the opportunity of attackers to access and/or hijack the accounts.

The following will provide, with reference to FIGS. 1, 2, 4, and 5, detailed descriptions of exemplary systems for logging users out of online accounts. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for logging users out of online accounts. As illustrated in this figure, exemplary system 100 may include one or more modules 102 for performing one or more tasks. For example, and as will be explained in greater detail below, exemplary system 100 may include a request module 104 that (i) receives, from a first computing device of a user, a request from the user to log into an online account hosted by an online platform and (ii) detects a request from the user to log out of the online account. Exemplary system 100 may also include an establishing module 106 that establishes, between the online platform and a second computing device of the user, a network session that both (i) verifies the identity of the user to the online platform and (ii) at least partially disrupts the functionality of the second computing device.

In addition, and as will be described in greater detail below, exemplary system 100 may include an authentication module 108 that logs the user into the online account via the first computing device in response to the network session being established between the online platform and the second computing device. Finally, exemplary system 100 may include a termination module 110 that, in response to the request to log out of the online account, (i) restores full functionality of the second computing device by terminating the network session between the online platform and the second computing device and (ii) logs the user out of the online account. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, computing device 204, and/or server 210), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
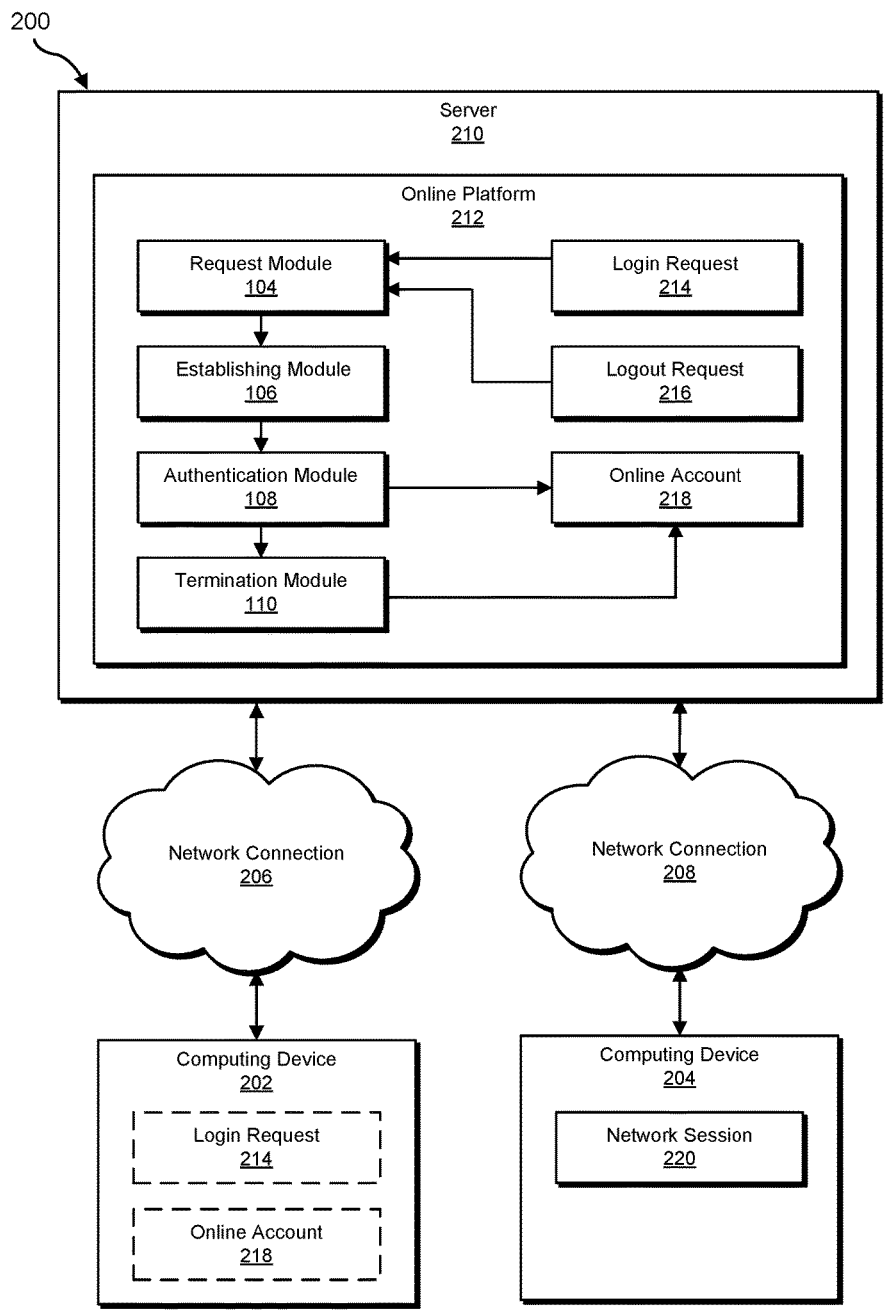
FIG. 2 is a block diagram of an additional exemplary system for logging users out of online accounts.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 210 that hosts an online platform 212 via a network connection 206. As also shown in FIG. 2, system 200 may include a computing device 204 in communication with server 210 via a network connection 208. In one example, server 210 may be programmed with one or more of modules 102. In this example, the modules hosted on server 210 may operate as part of online platform 212 to facilitate logging users into and out of online accounts hosted by online platform 212. Additionally or alternatively, computing device 202 and/or computing device 204 may be programmed with one or more of modules 102. In these examples, the modules hosted on computing device 202 and/or computing device 204 may facilitate a user of computing device 202 and/or computing device 204 logging into and out of an online account hosted by online platform 212.

In one embodiment, one or more of modules 102 from FIG. 1 may, when executed by at least one processor of server 210, enable server 210 to log users out of online accounts hosted by server 210. For example, and as will be described in greater detail below, request module 104 may cause server 210 to receive, from computing device 202, a login request 214 from a user of computing device 202 to log into an online account 218 hosted by online platform 212. In response to login request 214, establishing module 106 may cause server 210 to establish, between online platform 212 and computing device 204, a network session 220 that both (i) verifies the identity of the user to online platform 212 and (ii) at least partially disrupts the functionality of computing device 204. In response to network session 220 being established between online platform 212 and computing device 204, authentication module 108 may cause server 210 to log the user into online account 218 via computing device 202. Next, request module 104 may cause server 210 to detect a logout request 216 from the user to log out of online account 218. In response to logout request 216, termination module 110 may cause server 210 to (i) restore full functionality of computing device 204 by terminating network session 220 and (ii) log the user out of online account 218.

Computing devices 202 and 204 generally represent any type or form of computing device capable of reading computer-executable instructions. Examples of computing devices 202 and 204 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 210 generally represents any type or form of computing device that is capable of hosting online accounts and logging users into and out of the online accounts. Examples of server 210 include, without limitation, application servers and database servers configured to provide various database services and/or run certain software applications.

Network connections 206 and 208 generally represent any medium or architecture capable of facilitating communication or data transfer. In addition, network connections 206 and 208 may represent connections to the same network or connections to different networks. Examples of network connections 206 and 208 include, without limitation, connections to an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network connections 206 and 208 may facilitate communication or data transfer using wireless or wired connections. In one embodiment, network connection 206 may facilitate communication between computing device 202 and server 210, while network connection 208 may facilitate communication between computing device 204 and server 210.

Figure 3:
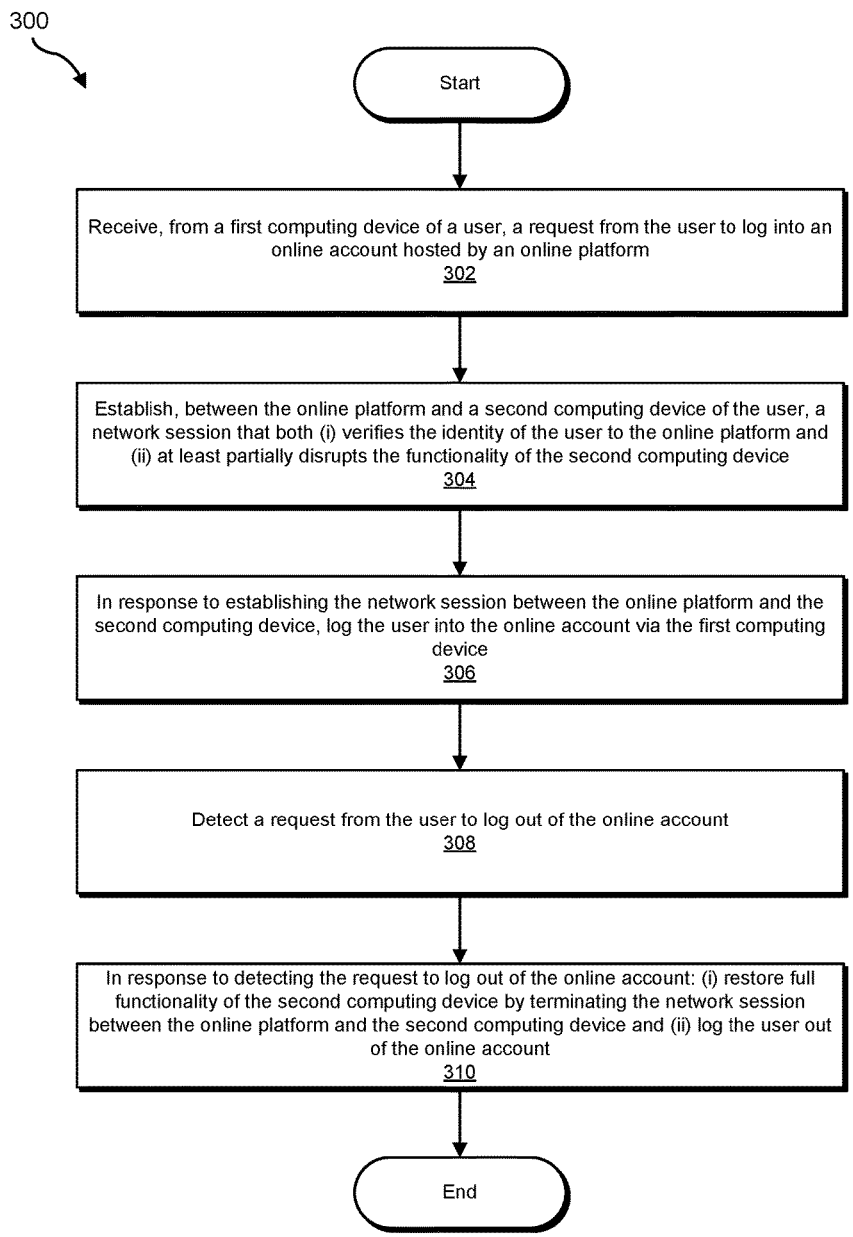
FIG. 3 is a flow diagram of an exemplary method for logging users out of online accounts.

FIG. 3 is a flow diagram of an exemplary computer-implemented method 300 for logging users out of online accounts. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive, from a first computing device of a user, a request from the user to log into an online account hosted by an online platform. For example, request module 104 may, as part of server 210 in FIG. 2, receive, from computing device 202, login request 214 to log into online account 218 hosted by online platform 212.

The term "online account," as used herein, generally refers to any portion of data and/or section of an online service dedicated to or managed by a particular user. In some examples, an online service (such as a banking service, media-streaming service, shopping service, etc.) may enable users to store, access, and manage personal data or content within online accounts. To protect the data and content within an online account, an online service may require or request that a user completes one or more authentication schemes (such as entering a username and a password combination and/or entering a one-time password) before the user is provided access to the account.

In addition, the term "online platform," as used herein, generally refers to any type or form of medium through which a user may access an online service and/or online account. For example, an online platform may represent or include a webpage or other portal through which a user can perform authentication schemes to log into an online account. Additionally or alternatively, an online platform may represent or include a server, virtual machine, or other computing device that hosts an online service.

The systems described herein may perform step 302 in a variety of ways. In some examples, request module 104 may monitor an online platform to detect attempts by users to access online accounts hosted by the online platform. For example, request module 104 may detect when a user has entered login credentials into a login portal provided by an online platform. Additionally or alternatively, request module 104 may detect when a user has clicked on a login button that opens a login portal and/or initiates an authentication scheme (such as one or more of the authentication scheme described below). In some embodiments, after detecting an attempt by a user to log into an online account, the systems described herein may prevent and/or postpone the user's access to the online account until performing one or more of the authentication schemes described below.

Returning to FIG. 3, at step 304 one or more of the systems described herein may establish, between the online platform and a second computing device of the user, a network session that both (i) verifies the identity of the user to the online platform and (ii) at least partially disrupts the functionality of the second computing device. For example, establishing module 106 may, as part of server 210 in FIG. 2, establish network session 220 that both (i) verifies the identity of the user to online platform 212 and (ii) at least partially disrupts the functionality of computing device 204.

The term "network session," as used herein, generally refers to any period of network communication between two computing devices. A network session may involve any type or form of network connection, including connections to wireless networks, wired networks, and cellular networks. As will be explained in greater detail below, the disclosed systems may establish a network session between an online platform and a computing device of a user as part of an authentication scheme to enable the user to access an online account provided by the online platform.

The systems described herein may perform step 304 in a variety of ways. In some examples, after detecting a request from a computing device of a user to access an online account, establishing module 106 may identify an additional computing device of the user with which to establish a network session used to verify the identity of the user. For example, the user may provide (or may have previously provided) a phone number of the user's mobile phone. Additionally or alternatively, the user may provide an email address or other contact information associated with the user and/or an additional computing device of the user. After identifying an additional computing device of a user (or a way to communicate with an additional computing device of a user), establishing module 106 may begin establishing a secure network session with the additional computing device.

In some examples, establishing module 106 may use a network session to provide and/or generate a one-time password that the user may enter to an online platform. The term "one-time password," as used herein, generally refers to any type or form of sequence or code including numbers, letters, and/or symbols that may authenticate a user or a user's computing device to an online platform once (and only once). A one-time password may be provided to and/or generated on a computing device associated with a user by an online platform and then entered to the online platform on an additional computing device to enable the user to access an online account via the additional computing device. After the user has been granted access to the online account, the one-time password may expire or be otherwise unusable in the event that the user attempts to log into the online account using the same one-time password at a later point in time. In some examples, an online platform may implement a multi-factor authentication scheme that requires or requests the use of a one-time password in addition to one or more other security protocols (e.g., traditional usernames and passwords).

Establishing module 106 may implement a variety of types of network sessions to provide users with one-time passwords. In one embodiment, establishing module 106 may establish a phone call between an online platform and a user's phone and then use a recording, text-to-speech program, or other suitable method to provide a one-time password to a user via the phone call. In another embodiment, establishing module 106 may provide a user with a one-time password by directing, via a wireless Internet connection or a cellular network, a software token on a computing device of the user to generate a one-time password for the user.

The term "software token," as used herein, generally refers to any type or form of program or application that enables a computing device to authenticate its identity to another device or entity by generating a one-time password based on a code, process, or key known only by the two parties involved in the authentication. Software tokens may generate one-time passwords using any one or combination of security or verification techniques, such as shared secrets, personal identification numbers, and/or cryptographic keys.

Figure 4:
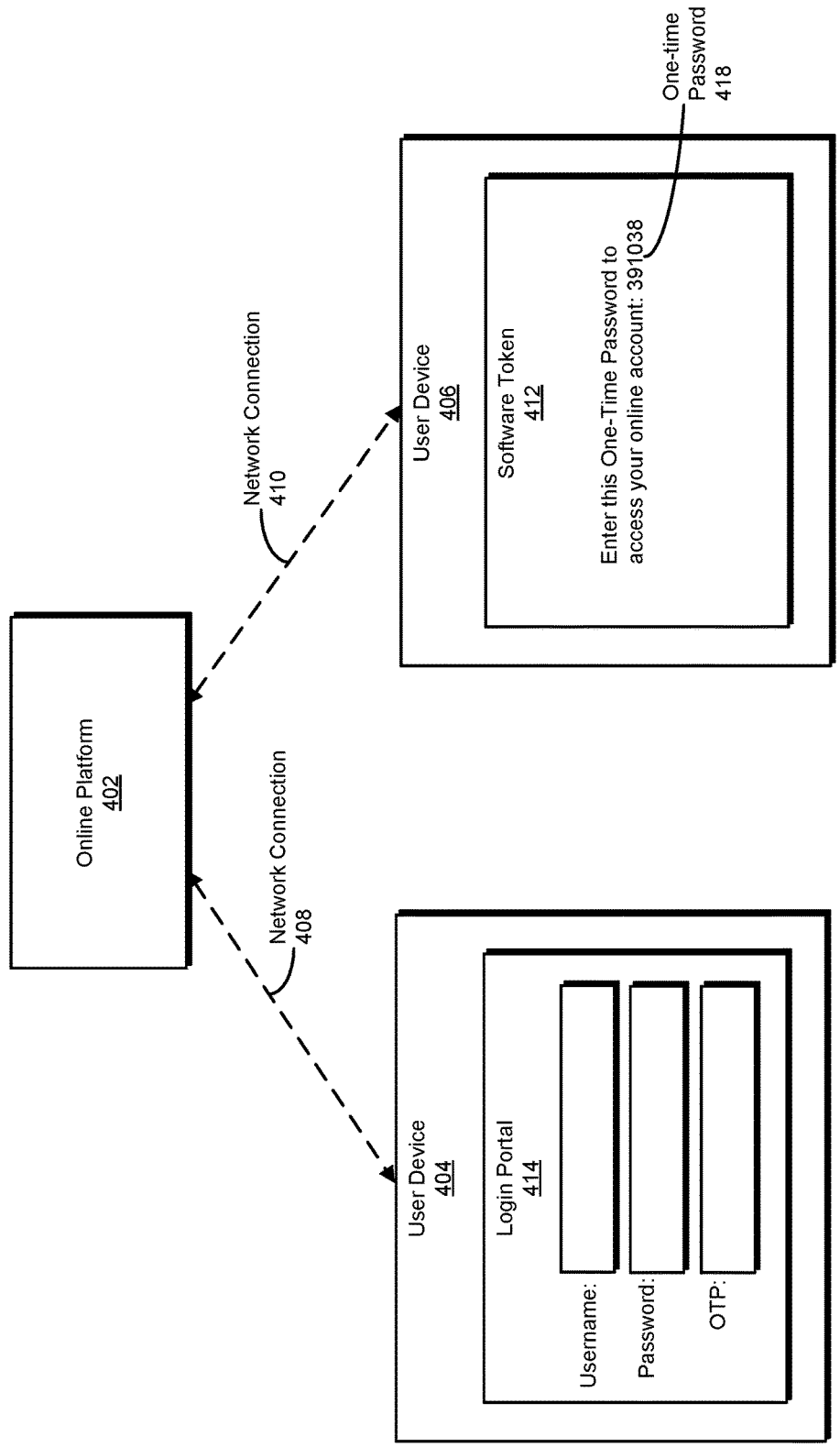
FIG. 4 is a block diagram of an exemplary system for logging users into online accounts.

FIG. 4 illustrates an example of providing a user with a one-time password via a software token. In this example, a user of a user device 404 may have requested, via a network connection 408, to access an online account hosted by an online platform 402. In response to the request, online platform 402 may display, on user device 404, a login portal 414 that prompts the user to enter a username, password, and a one-time password ("OTP" in FIG. 4) in order to be granted access to the online account. In order for the user to provide the one-time password, online platform 402 may direct a software token 412 to run on a user device 406 (i.e., another device owned and/or controlled by the user) via a network connection 410. As shown in FIG. 4, software token 412 may provide the user with a one-time password 418 containing the sequence "391038." The user may then enter this sequence into login portal 414 to verify the user's identity to online platform 402.

In addition to verifying the identity of a user to an online platform, a network session between a computing device and the online platform may partially or fully disrupt the functionality of the computing device. For example, an application that maintains a network session on a computing device (e.g., a phone application or an application that manages software tokens) may prohibit a user from performing one or more actions and/or prohibit one or more other applications from running on the computing device. In one example, while a computing device maintains a connection to a phone call with an online platform, a user of the computing device may unable to participate in another phone call. In another example, a software token may operate in the foreground of a computing device, preventing any additional applications from executing.

In some embodiments, such disruptions may represent inherent inconveniences resulting from the configuration of applications and/or computing devices involved in network sessions. Additionally or alternatively, establishing module 106 may intentionally limit the functionality of a computing device while the computing device is involved in a network session with an online platform. For example, while a computing device maintains a network session with an online platform, establishing module 106 (or an additional module executing on the computing device) may perform actions such as preventing a user from providing input to the computing device and/or preventing the computing device from performing any additional network activity.

Returning to FIG. 3, at step 306 one or more of the systems described herein may log the user into the online account via the first computing device in response to the network session being established between the online platform and the second computing device. For example, authentication module 108 may, as part of server 210 in FIG. 2, log the user into online account 218 via computing device 202 in response to network session 220 being established between online platform 212 and computing device 204.

The systems described herein may perform step 306 in a variety of ways. In some examples, authentication module 108 may provide a user access to an online account after determining that a secure network session has been established between a computing device of the user and an online platform that hosts the online account. In other examples, in the event that establishing module 106 provided a user with a one-time password via such a network session, authentication module 108 may provide the user access to an online account after determining that the user has entered the one-time password to an online platform that hosts the online account. In some embodiments, authentication module 108 may further require that a user enter appropriate authentication credentials (e.g., a traditional username and password combination) before the user is authenticated and allowed access to an online account.

After determining that a user should be permitted access to an online account, authentication module 108 may log the user into the online account via the initial computing device on which the user requested access to the account (rather than the computing device involved in a network session used to verify the identity of the user). In addition, in contrast to traditional authentication systems, establishing module 106 may not disconnect or terminate a phone call and/or software token used to provide a one-time password for a user after the user is logged into an online account.

In the example of FIG. 4, after determining that the user has entered one-time password 418 (as well as an appropriate username and password combination) to online platform 402 via login portal 414, online platform 402 may log the user into an online account on user device 404. After the user is logged into the online account, software token 412 may continue to operate in the foreground of user device 406.

In some examples, the systems described herein may allow a user to simultaneously access an online account via multiple computing devices. For example, after authentication module 108 provides a user access to an online account on one computing device (but before the user is logged out of the account on the computing device), request module 104 may detect an additional request from an additional computing device of the user to log into the same online account. In response, authentication module 108 may utilize an existing network session (i.e., the network session that was used to initially authenticate the user) to provide the user access to the online account on the additional computing device.

Returning to FIG. 3, at step 308 one or more of the systems described herein may detect a request from the user to log out of the online account. For example, request module 104 may, as part of server 210 in FIG. 2, detect logout request 216 to log the user out of online account 218.

The systems described herein may perform step 308 in a variety of ways. In some examples, request module 104 may monitor a user's interactions with an online platform for an indication that a user wishes to log out of an online account hosted by the online platform. A user may provide such an indication via either a computing device used to access an online account or a computing device used to establish a secure network session with an online platform. For example, request module 104 may determine that a user wishes to log out of an online account by determining that the user has clicked on a logout, exit, or similar button within a user interface of an online account on the computing device used by the user to access the online account. In another example, request module 104 may determine that a user wishes to log out of an online account by determining that the user has terminated a secure network session on a computing device used to authenticate the user.

Figure 5:
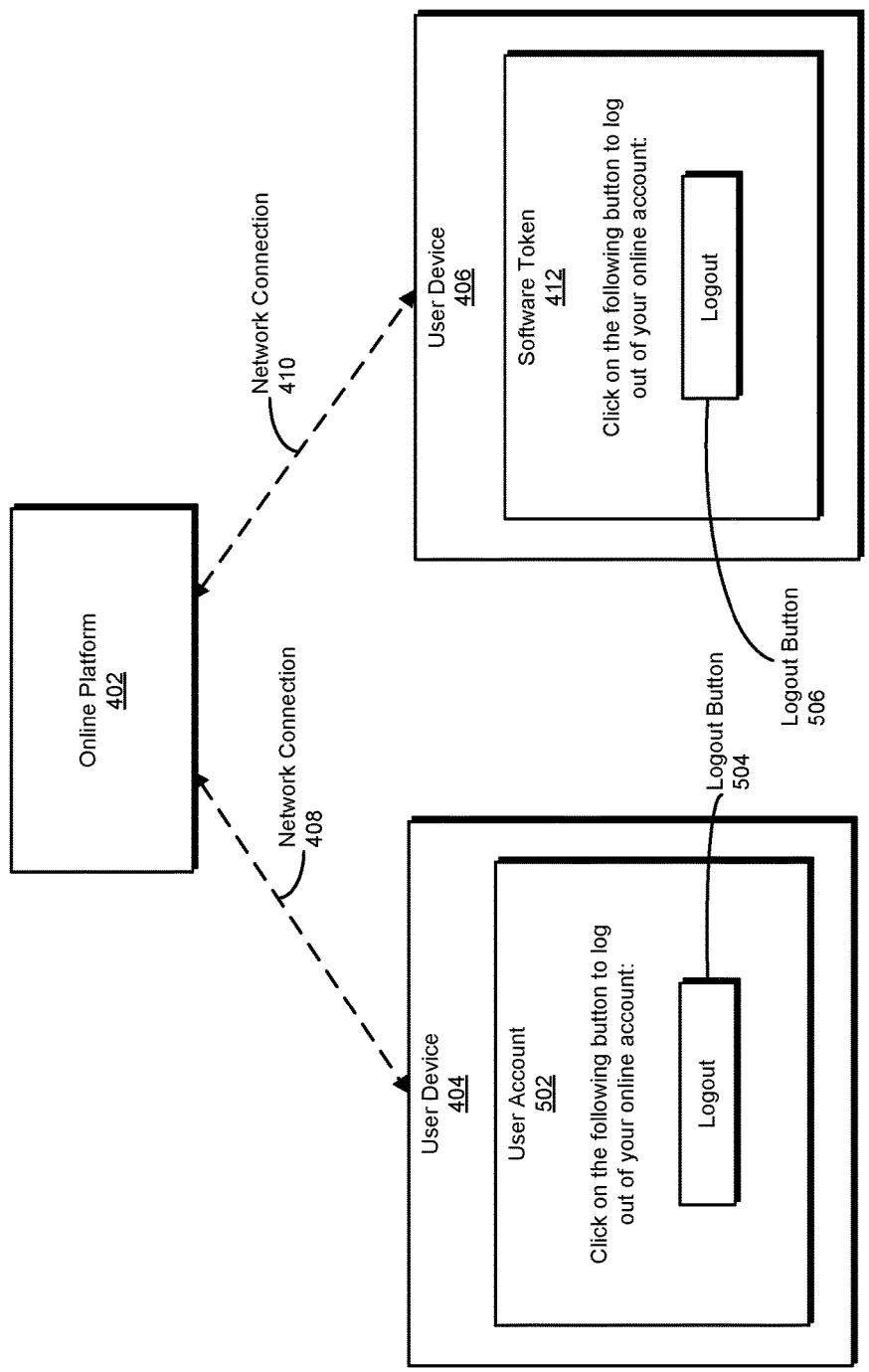
FIG. 5 is a block diagram of an additional exemplary system for logging users out of online accounts.

As an example, FIG. 5 illustrates at least a portion of user device 404 and user device 406 (shown in FIG. 4) after the user has been logged into a user account 502. As shown in FIG. 5, user account 502 (accessed on user device 404) may provide the user with a logout button 504 that enables the user to log out of user account 502. As also shown in FIG. 5, software token 412, still running on user device 406, may display a similar logout button 506. In this example, the user may click on either logout button 504 or logout button 506 to initiate logging out of user account 502.

Returning to FIG. 3, at step 310 one or more of the systems described herein may, in response to the request to log out of the online account, (i) restore full functionality of the second computing device by terminating the network session between the online platform and the second computing device and (ii) log the user out of the online account. For example, termination module 110 may, as part of server 210 in response to logout request 216, (i) restore full functionality of computing device 204 by terminating network session 220 and (ii) log the user out of online account 218.

The systems described herein may perform step 310 in a variety of ways. In the event that a user initiated logging out of an online account directly via the computing device on which the user was logged into the online account, termination module 110 may complete the logout process on the computing device (e.g., by clearing session cookies or other data that authenticates the user and/or computing device to the online platform that hosts the online account). In addition, termination module 110 may terminate a network session that was established between the online platform and an additional computing device of the user to authenticate the user to the online platform. In particular, termination module 110 may automatically terminate the network session without requiring input from the user on the additional computing device. Conversely, termination module 110 may automatically log a user out of an online account on a computing device on which the user was provided access to the online account in the event that the user terminated a network session between an online platform and another computing device of the user.

Once a network session between an online platform and a computing device is terminated (either by a user or termination module 110), any limitations or restrictions imposed on the computing device by the network session may be removed, allowing the user to interact fully with the computing device. Furthermore, in the event that authentication module 108 logged a user into the same online account on multiple computing devices, termination module 110 may simultaneously log the user out of the online account on each computing device, even if the user only initiated a logout process on one computing device.

As explained above in connection with FIG. 3, an online platform may detect an attempt by a computing device of a user to access an online account hosted by the online platform. Before allowing the user to log into the online account, the online platform may authenticate the user via a network session established between the online platform and another computing device of the user. In particular, this network session may provide the user with a one-time password via a phone call or software token. Once the user enters the one-time password to the online platform, the online platform may log the user into the account via the initial computing device, while still maintaining the network session on the user's other computing device. The online platform may link the duration of the network session with the duration of the user's login session such that the network session is maintained until the user logs out of the online account. Because the network session may disrupt the functionality of the computing device on which it is established, the user may be motivated to log out of the online account after completing their desired tasks within the account, thereby reducing the risk that an attacker or unauthorized entity may access the account.

Figure 6:
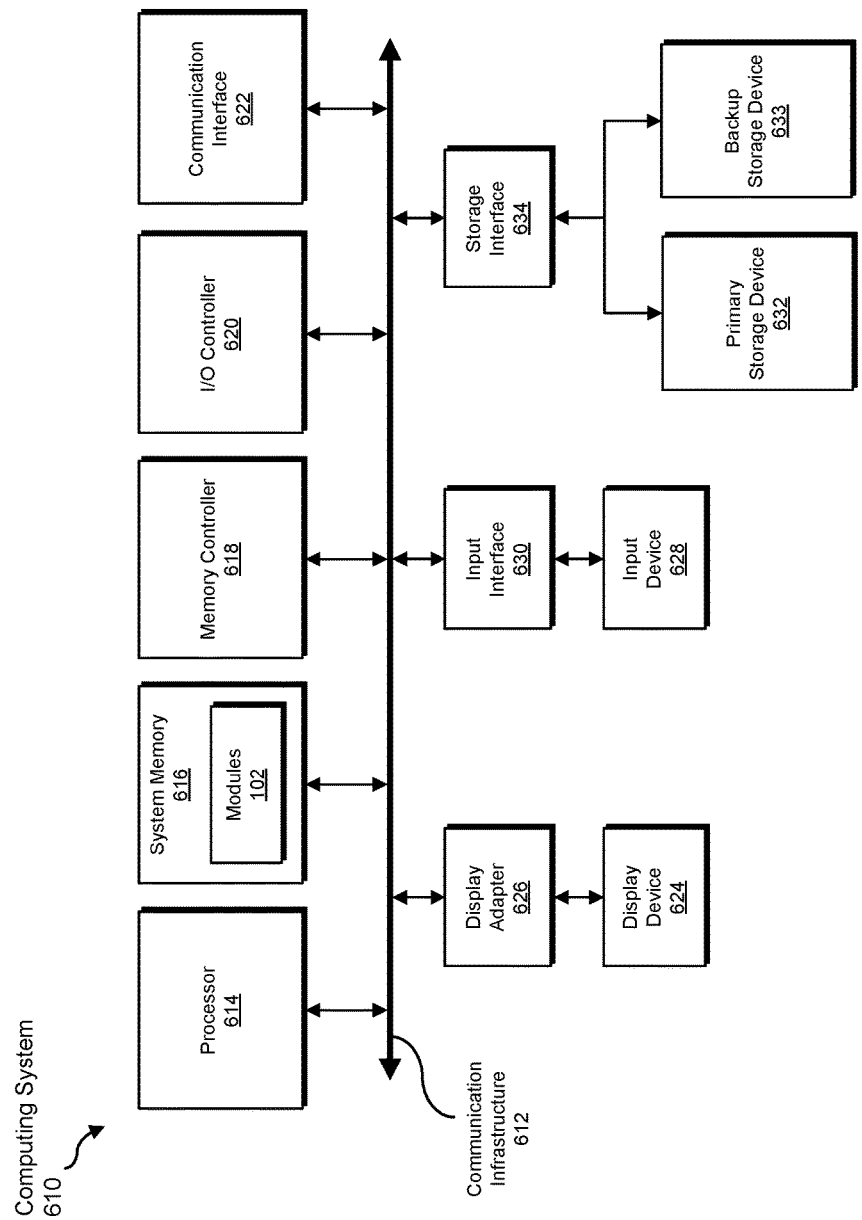
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
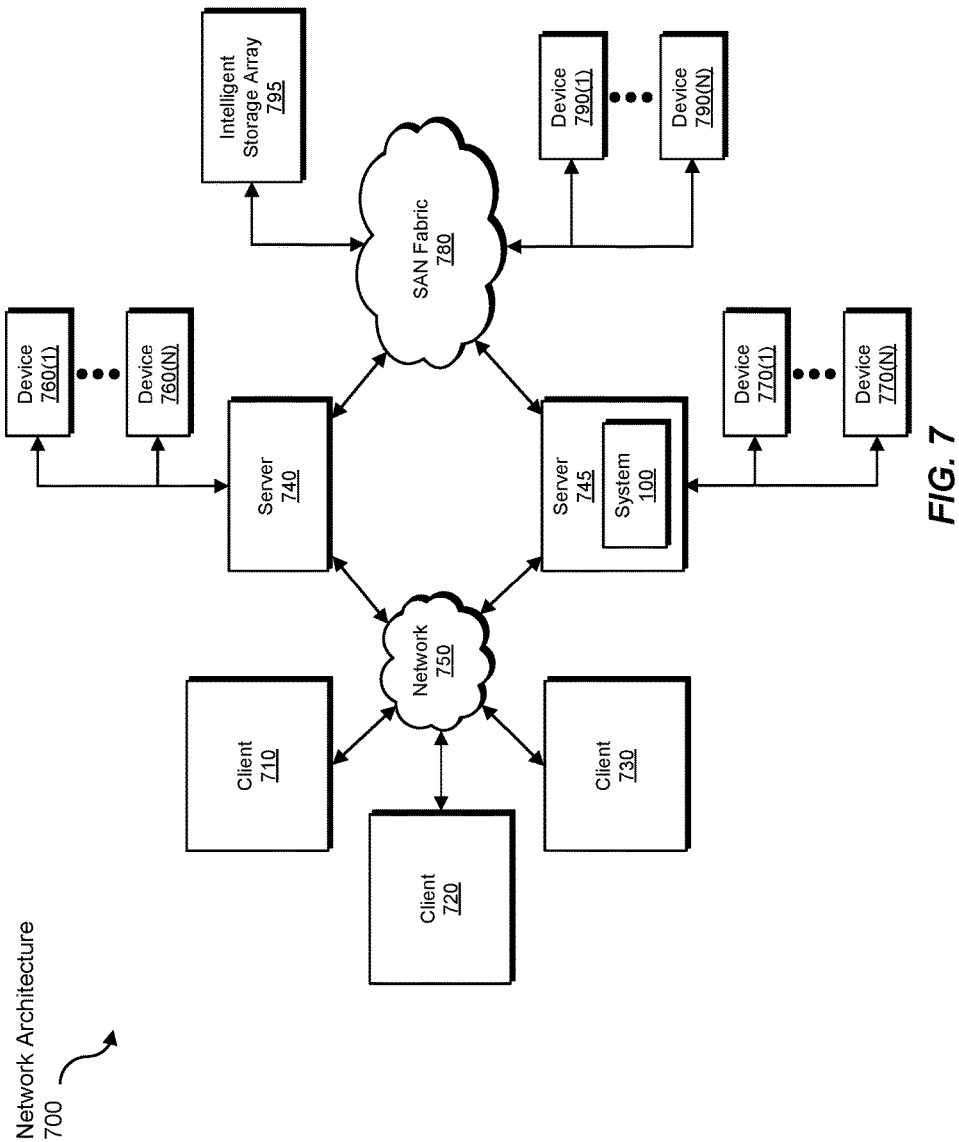
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for logging users out of online accounts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an indication that a secure network session has been established between a computing device of a user and an online platform that provides an online account for the user, transform the indication of the network session into an authentication of the user, output a result of the transformation to the online platform, use the result of the transformation to provide the user access to the online account while the network session is established, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for logging users out of online accounts, at least a portion of the method being performed by a computing device comprising at least one processor, the method comprising:
   receiving, from a first computing device of a user, a request from the user to log into an online account that:
      enables the user to perform at least one online task; and
      is hosted by an online platform;
   establishing, between the online platform and a second computing device of the user, a network session that both:
      verifies the identity of the user to the online platform by providing, to the online platform, authentication credentials associated with the user; and
      at least partially disrupts the functionality of the second computing device while the user is logged into the online account via the first computing device such that the user is motivated to log out of the online account after performing the online task;
   in response to establishing the network session between the online platform and the second computing device, logging the user into the online account via the first computing device;
   detecting a request from the user to log out of the online account; and
   in response to detecting the request to log out of the online account:
   restoring full functionality of the second computing device by terminating the network session between the online platform and the second computing device; and
   logging the user out of the online account.

2. The method of claim 1, wherein establishing the network session between the online platform and the second computing device of the user comprises establishing a phone call between the online platform and the second computing device.

3. The method of claim 1, wherein establishing the network session between the online platform and the second computing device of the user comprises providing, via a network connection between the online platform and the second computing device, a software token that runs on the second computing device.

4. The method of claim 1, wherein the network session provides the authentication credentials associated with the user to the online platform by providing the user with a one-time password that the user enters to the online platform via the first computing device.

5. The method of claim 1, wherein the network session disrupts the functionality of the second computing device by preventing, while the network session is established via an application running in a foreground of the second computing device, the user from accessing at least one additional application installed on the second computing device.

6. The method of claim 1, further comprising determining that the user has entered authenticated login credentials into the online platform via the first computing device prior to logging the user into the online account.

7. The method of claim 1, wherein:
   detecting the request from the user to log out of the online account comprises determining that the user has initiated a logout process on the first computing device; and
   terminating the network session between the online platform and the second computing device comprises automatically terminating the network session without input from the user on the second computing device.

8. The method of claim 1, wherein:
   detecting the request from the user to log out of the online account comprises determining that the user has initiated terminating the network session on the second computing device; and
   logging the user out of the online account comprises automatically logging the user out of the online account without input from the user on the first computing device.

9. The method of claim 1, further comprising:
logging the user into the online account via a third computing device of the user while the network session is established between the online platform and the second computing device of the user; and
in response to detecting the request to log the user out of the online account, logging the user out of the online account on both the first computing device and the third computing device.

10. The method of claim 1, wherein logging the user out of the online account comprises preventing an unauthorized entity from accessing sensitive data stored within the online account.

11. A system for logging users out of online accounts, the system comprising:
a request module, stored in memory, that receives, from a first computing device of a user, a request from the user to log into an online account that:
enables the user to perform at least one online task; and
is hosted by an online platform;
an establishing module, stored in memory, that establishes, between the online platform and a second computing device of the user, a network session that both:
verifies the identity of the user to the online platform by providing, to the online platform, authentication credentials associated with the user; and
at least partially disrupts the functionality of the second computing device while the user is logged into the online account via the first computing device such that the user is motivated to log out of the online account after performing the online task;
an authentication module, stored in memory, that logs the user into the online account via the first computing device in response to the network session being established between the online platform and the second computing device;
wherein the request module further detects a request from the user to log out of the online account;
a termination module, stored in memory, that in response to the request to log out of the online account:
restores full functionality of the second computing device by terminating the network session between the online platform and the second computing device; and
logs the user out of the online account; and
at least one hardware processor that is configured to execute the request module, the establishing module, the authentication module, and the termination module.

12. The system of claim 11, wherein the establishing module establishes the network session between the online platform and the second computing device of the user by establishing a phone call between the online platform and the second computing device.

13. The system of claim 11, wherein the establishing module establishes the network session between the online platform and the second computing device of the user by providing, via a network connection between the online platform and the second computing device, a software token that runs on the second computing device.

14. The system of claim 11, wherein the network session provides the authentication credentials associated with the user to the online platform by providing the user with a one-time password that the user enters to the online platform via the first computing device.

15. The system of claim 11, wherein the network session disrupts the functionality of the second computing device by preventing, while the network session is established via an application running in a foreground of the second computing device, the user from accessing at least one additional application installed on the second computing device.

16. The system of claim 11, wherein the authentication module further determines that the user has entered authenticated login credentials into the online platform via the first computing device prior to logging the user into the online account.

17. The system of claim 11, wherein:
the request module detects the request from the user to log out of the online account by determining that the user has initiated a logout process on the first computing device; and
the termination module terminates the network session between the online platform and the second computing device by automatically terminating the network session without input from the user on the second computing device.

18. The system of claim 11, wherein:
the request module detects the request from the user to log out of the online account by determining that the user has initiated terminating the network session on the second computing device; and
the termination module logs the user out of the online account by automatically logging the user out of the online account without input from the user on the first computing device.

19. The system of claim 11, wherein:
the authentication module further logs the user into the online account via a third computing device of the user while the network session is established between the online platform and the second computing device of the user; and
in response to the request to log the user out of the online account, the termination module logs the user out of the online account on both the first computing device and the third computing device.

20. A non-transitory computer-readable medium comprising one or more computer-readable instructions that, when executed by at least one processor of a computing device, cause the computing device to:
receive, from a first computing device of a user, a request from the user to log into an online account that:
enables the user to perform at least one online task; and
is hosted by an online platform;
establish, between the online platform and a second computing device of the user, a network session that both:
verifies the identity of the user to the online platform by providing, to the online platform, authentication credentials associated with the user; and
at least partially disrupts the functionality of the second computing device while the user is logged into the online account via the first computing device such that the user is motivated to log out of the online account after performing the online task;
in response to establishing the network session between the online platform and the second computing device, log the user into the online account via the first computing device;
detect a request from the user to log out of the online account; and in response to detecting the request to log out of the online account:
  restore full functionality of the second computing device by terminating the network session between the online platform and the second computing device; and
  log the user out of the online account.

* * * * *